United States Patent
Peterson et al.

(10) Patent No.: US 12,204,318 B2
(45) Date of Patent: Jan. 21, 2025

(54) SYSTEMS AND METHODS FOR MOTOR CONTROL CENTER TRUNK AND DROP CONNECTOR

(71) Applicant: Rockwell Automation Technologies, Inc., Mayfield Heights, OH (US)

(72) Inventors: Corey A. Peterson, Grafton, WI (US); Roberto S. Marques, Cedarburg, WI (US); Troy M. Bellows, Racine, WI (US); Calvin C. Steinweg, Hartford, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 606 days.

(21) Appl. No.: 17/490,031

(22) Filed: Sep. 30, 2021

(65) Prior Publication Data

US 2023/0098106 A1     Mar. 30, 2023

(51) Int. Cl.
  *G05B 19/418*     (2006.01)

(52) U.S. Cl.
  CPC ..... *G05B 19/4185* (2013.01); *G05B 19/4183* (2013.01)

(58) Field of Classification Search
  CPC .................. G05B 19/4185; G06B 19/4183
  See application file for complete search history.

(56) References Cited

U.S. PATENT DOCUMENTS

| | | | |
|---|---|---|---|
| 7,716,567 B1 * | 5/2010 | Retlich | G05B 23/0216 715/200 |
| 8,274,782 B2 | 9/2012 | Blodorn et al. | |
| 11,114,783 B1 | 9/2021 | Wang et al. | |
| 2003/0072144 A1 * | 4/2003 | Malkowski, Jr. | H02B 1/202 361/826 |
| 2008/0137266 A1 * | 6/2008 | Jensen | H02B 1/21 710/316 |
| 2012/0078545 A1 * | 3/2012 | Hong | G01R 21/133 702/60 |
| 2013/0278082 A1 | 10/2013 | Barstz et al. | |
| 2014/0063661 A1 * | 3/2014 | D'Aversa | H02H 1/0015 361/23 |

(Continued)

FOREIGN PATENT DOCUMENTS

| | | |
|---|---|---|
| DE | 9204389 U1 | 7/1993 |
| EP | 2544058 A1 | 1/2013 |

(Continued)

OTHER PUBLICATIONS

Extended European Search Report for Application No. 22196591.6 mailed Mar. 24, 2023, 14 pages.

(Continued)

*Primary Examiner* — Henry Tsai
*Assistant Examiner* — Aurangzeb Hassan
(74) *Attorney, Agent, or Firm* — Fletcher Yoder, P.C.

(57) ABSTRACT

A system includes a multidrop cable and a connector. The connector is configured to couple to one or more MCC withdrawable units installed in one or more respective buckets of an MCC, wherein the connector is configured to couple the one or more MCC withdrawable units to, and decouple the one or more MCC withdrawable units from, the multidrop cable without disrupting a network or a subnet of the MCC.

20 Claims, 9 Drawing Sheets

(56) References Cited

U.S. PATENT DOCUMENTS

| | | | | |
|---|---|---|---|---|
| 2016/0013601 | A1* | 1/2016 | El Zakhem | H01R 25/162 |
| | | | | 439/94 |
| 2020/0344906 | A1* | 10/2020 | Frye | H05K 7/1478 |
| 2020/0393891 | A1* | 12/2020 | Baggett | H04L 12/12 |
| 2022/0141290 | A1* | 5/2022 | Chelmecki | H04L 67/55 |
| | | | | 709/220 |
| 2023/0102683 | A1* | 3/2023 | Freeman | H04L 41/5054 |
| | | | | 370/254 |

FOREIGN PATENT DOCUMENTS

| | | |
|---|---|---|
| EP | 3179582 A1 | 6/2017 |
| EP | 3562283 A1 | 10/2019 |

OTHER PUBLICATIONS

Partial European Search Report for Application No. 22196591.6 mailed Feb. 3, 2023, 15 pages.
Extended European Search Report for Application No. 22196589.0 mailed Feb. 3, 2023, 12 pages.

* cited by examiner

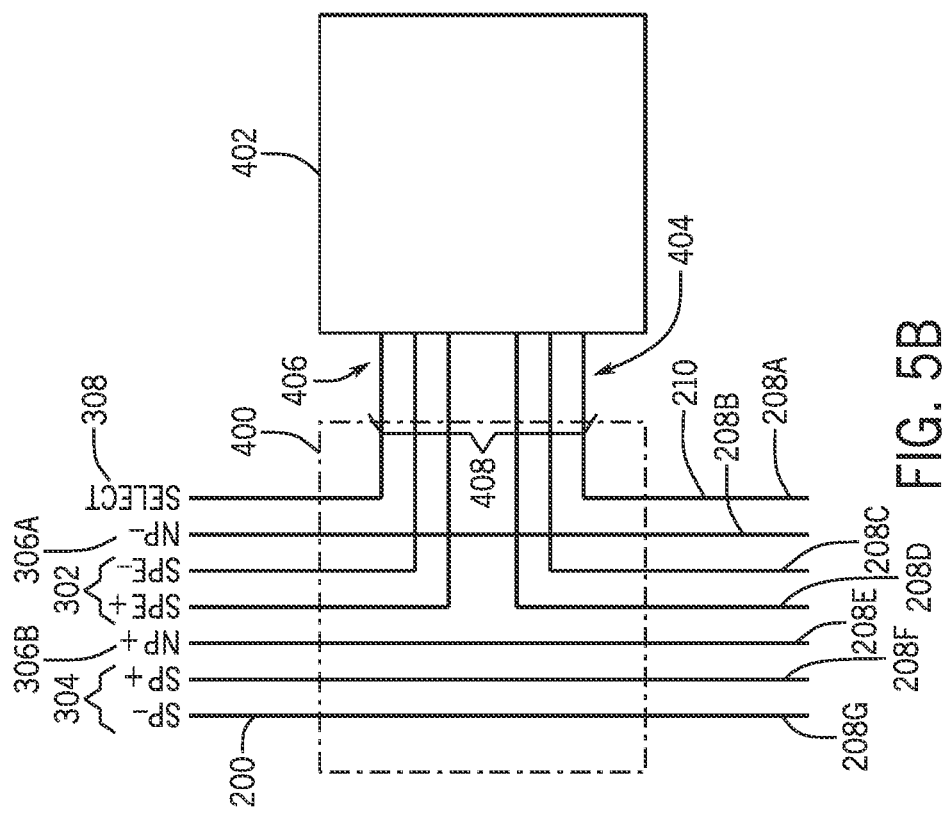
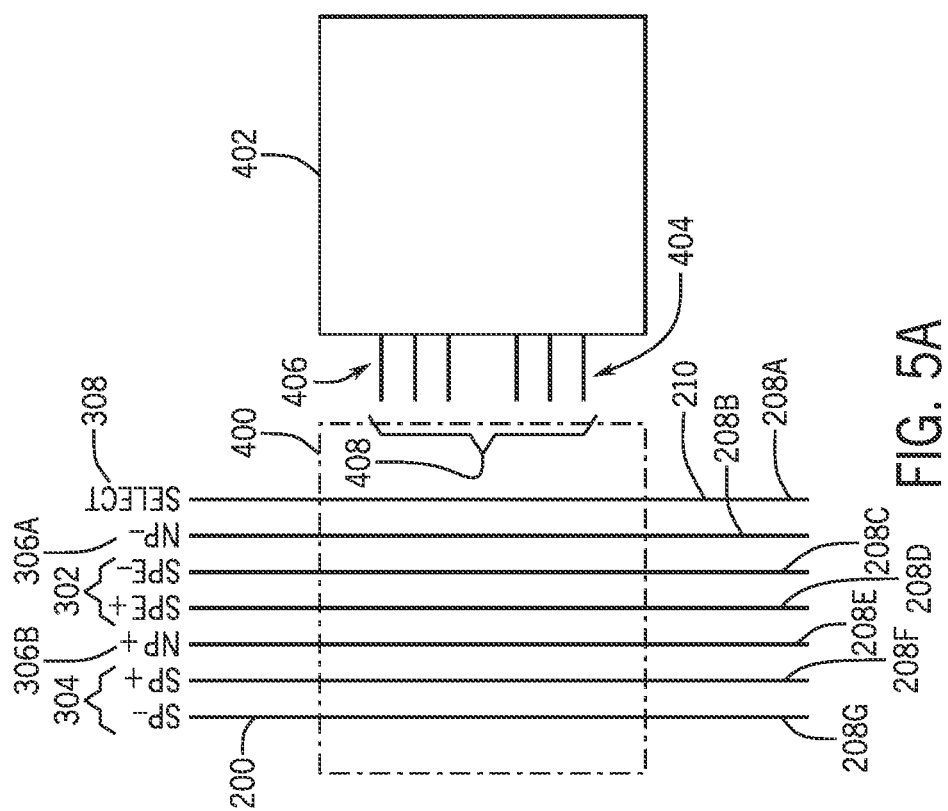

SYSTEMS AND METHODS FOR MOTOR CONTROL CENTER TRUNK AND DROP CONNECTOR

BACKGROUND

The present disclosure relates generally to motor control centers (MCCs) for industrial automation systems. More specifically, the present disclosure relates to trunk and drop connectors for connecting and disconnecting withdrawable MCC units to an MCC of an industrial automation system.

Industrial automation systems may be used to provide automated control of one or more actuators. A controller may output a conditioned power signal to an actuator to control movement of the actuator. Multiple controllers of an industrial automation system may be grouped together, along with other components, and housed in an enclosure to form an MCC. MCCs are divided into vertical sections, with each section further divided into one or more buckets. The buckets are configured to receive units (e.g., pieces of industrial automation equipment). The various components and/or units of an MCC, and the components within those units, may communicate with one another via a wired network or subnet. For example, a multidrop cable may be run through an enclosure of the MCC and be communicatively coupled to the units within the MCC, and/or the components within a unit. If a unit of the MCC is inserted or removed over too long a period of time, inserting or removing the unit may disturb the network and/or subnet. Accordingly, there is a need for a way to insert and remove units from an MCC without disturbing the network and/or subnet.

BRIEF DESCRIPTION

In one embodiment, a system includes a multidrop cable and a connector. The multidrop cable includes a first connector and a second connector. The first connector includes a first terminal configured to communicatively couple to a first unit installed in first bucket of a motor control center (MCC) of an industrial automation system. The second connector is configured to couple to a second unit installed in a second bucket of the MCC, wherein the second unit comprises an MCC withdrawable unit, and wherein the second connector is configured to couple the MCC withdrawable unit to, and decouple the MCC withdrawable unit from, the multidrop cable without disrupting a network or a subnet of the MCC.

In another embodiment, a first connector is configured to communicatively couple a trunk of a multidrop cable to a motor control center (MCC) withdrawable unit of an MCC for an industrial automation system. The trunk of the multidrop cable is communicatively coupled to a second connector that includes a first terminal. The first connector includes one or more input pins communicatively coupled to one or more conductors extending through the trunk of the multidrop cable, and one or more output pins communicatively coupled to the one or more conductors extending through the trunk of the multidrop cable. The first connector connects a plurality of nodes associated with the MCC withdrawable unit installed in a bucket of the MCC to a network or a subnet of the MCC.

In yet another embodiment, a system includes a motor control center (MCC) of an industrial automation system and a multidrop cable. The MCC includes first and second buckets. The multidrop cable includes a first connector coupled to a first end of the trunk and having a first terminal configured to communicatively couple to a first unit installed in the first bucket of the MCC, and a second connector coupled to a second end of the trunk. The second connector is configured to communicatively couple to a second unit installed in the second bucket of the MCC, wherein the second unit comprises an MCC withdrawable unit. The second connector is configured to couple the MCC withdrawable unit to, and decouple the MCC withdrawable unit from, the multidrop cable without disrupting a network or a subnet of the MCC.

DRAWINGS

These and other features, aspects, and advantages of the present embodiments will become better understood when the following detailed description is read with reference to the accompanying drawings in which like characters represent like parts throughout the drawings, wherein:

FIG. 5A is a schematic view of a trunk and drop connector with a unit of nodes disconnected from a trunk of the multidrop cable shown in FIGS. 3 and 4, in accordance with embodiments presented herein;

FIG. 5B is a schematic view of the trunk and drop connector of FIG. 5A with the unit of nodes connected to the trunk of the multidrop cable, in accordance with embodiments presented herein;

DETAILED DESCRIPTION

Figure 1:
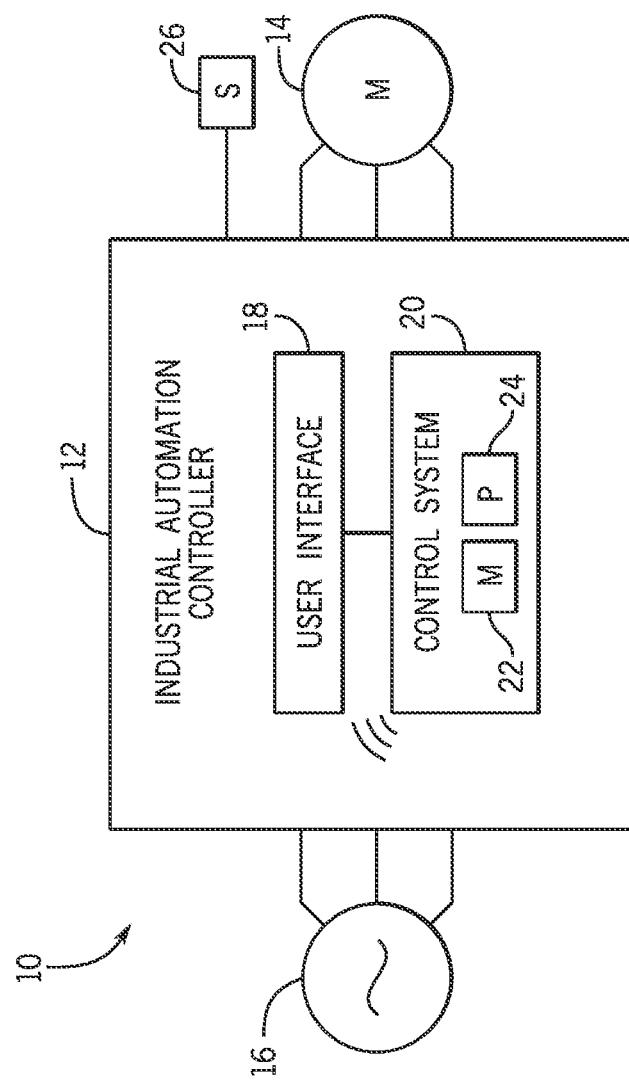
FIG. 1 is a schematic view of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

An industrial automation system may utilize a controller to output a conditioned power signal to one or more actuators to control movement of the actuators. The controller may be combined with other components in a housing or enclosure to form a motor control center (MCC) that controls the movement of multiple actuators. An enclosure of an MCC may be divided into one or more vertical sections, with each section further divided into one or more buckets that are configured to receive units (e.g., variable frequency drives (VFDs), programmable logic controllers (PLCs), programmable automation controllers (PACs), contactors, starters, overload protection components, fuses, circuit breakers, disconnects, short circuit protectors, etc.). A multidrop cable may be routed through an enclosure of the MCC and be communicatively coupled to the units within the MCC, and in some cases, components within the units, to establish a subnet or a network that is part of another network for the MCC. If a unit of the MCC is inserted or removed over too long a period of time, inserting or removing the unit may disturb the network and/or subnet.

The disclosed techniques include a trunk and drop connector for coupling to a withdrawable MCC unit to a multidrop cable. Specifically, the multidrop cable may serve as a trunkline and may include conductors that form a single pair Ethernet (SPE) pair that facilitate communication of data between components of the subnet, a switched power (SP) pair that provide power to components of the subnet, a network power (NP) pair that provide power for the subnet, and a select line that manages communication via the SPE pair. The trunk and drop connector includes pins that couple input and output lines of an MCC withdrawable unit to the SPE pair and the selection line but allow the SP pair and NP to continue through the trunk line uninterrupted. The trunk and drop connector enables the addition of multiple nodes, within the MCC withdrawable unit, to the subnet to which various components (e.g., variable frequency drives (VFDs), programmable logic controllers (PLCs), programmable automation controllers (PACs), contactors, starters, overload protection components, fuses, circuit breakers, disconnects, short circuit protectors, etc.) may connect. Further, the trunk and drop connector enables withdrawable MCC units to be coupled to a decoupled from the multidrop cable in a way that does not disturb the network or subnet within the MCC.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, a battery (or other power storage device), or an external power grid. Though the controller 12 shown in FIG. 1 is a stand-alone controller 12, in more complex industrial automation systems 10, one or more controllers 12 may be grouped together with other components in a motor control center (MCC, shown and described below with regard to FIG. 2) to control multiple actuators. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22 and configured to be executed by the processor 24) to provide signals for driving the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software configuration or firmware code that may be loaded onto the internal memory 22 of the control system 20 or programmed via the user interface 18 of the controller 12. The control system 20 may respond to a defined set of operating parameters. The settings of the various operating parameters determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) like control programming, and the like.

In some embodiments, the controller 12 may be communicatively coupled to one or more sensors 26 for detecting operating temperatures, voltages, currents, pressures, flow rates, etc. within the industrial automation system 10. With feedback data from the sensors, the control system 20 may keep detailed track of the various conditions under which the industrial automation system 10 may be operating. For example, the feedback data may include conditions such as actual motor speed, voltage, frequency, power quality, alarm conditions, etc.

Figure 2:
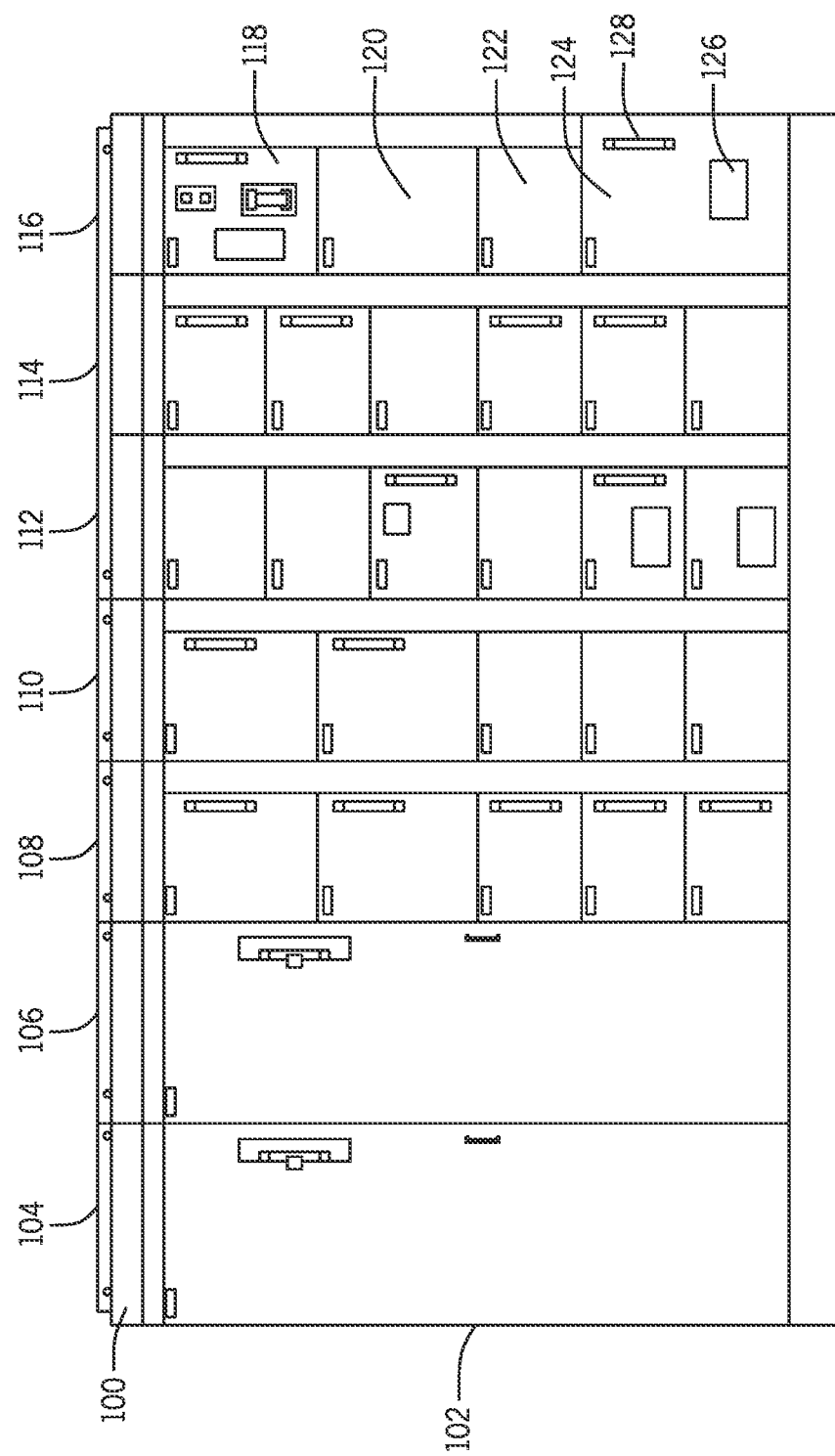
FIG. 2 is a front view of an embodiment of an MCC, in accordance with embodiments presented herein.

As mentioned above, in some complex industrial automation systems 10, one or more controllers and/or other industrial automation components (e.g., variable frequency drives (VFDs), PLCs, programmable automation controllers (PACs), contactors, starters, overload protection components, fuses, circuit breakers, disconnects, short circuit protectors, etc.) may be combined into an enclosure or cabinet and referred to as an MCC. FIG. 2 is a front view of an embodiment of an MCC 100. As shown, the MCC 100 includes an enclosure 102 that is divided into vertical sections 104, 106, 108, 110, 112, 114, 116. Each section may be further divided into one or more buckets 118, 120, 122, 124, which may be configured to receive units. The units may include, industrial automation components configured to perform industrial automation functions. The units may thus include, for example, motor controllers, VFDs, PLCs, PACs, contactors, starters, overload protection components, fuses, circuit breakers, disconnects, short circuit protectors, and so forth. In some embodiments, the size of each bucket 118, 120, 122, 124 may be customized to the type of unit the bucket 118, 120, 122, 124 is configured to receive. In other embodiments, different MCCs 100 may be available preconfigured with differently sized buckets. As shown, the cabinet doors 126 of some buckets may include disconnect switches 128 for disconnecting the respective unit from the MCC 100. Accordingly, to remove a unit, a user may actuate the disconnect switch 128 (e.g., from "on" to "off") to electrically disconnect the unit from the MCC 100. The user may then open the cabinet door 126, and physically remove the unit from the enclosure 102. If the unit is being replaced with a different unit, the new unit may be physically installed in the bucket 124, the cabinet door 126 closed, and the disconnect switch 128 actuated (e.g., from "off" to "on").

Figure 3:
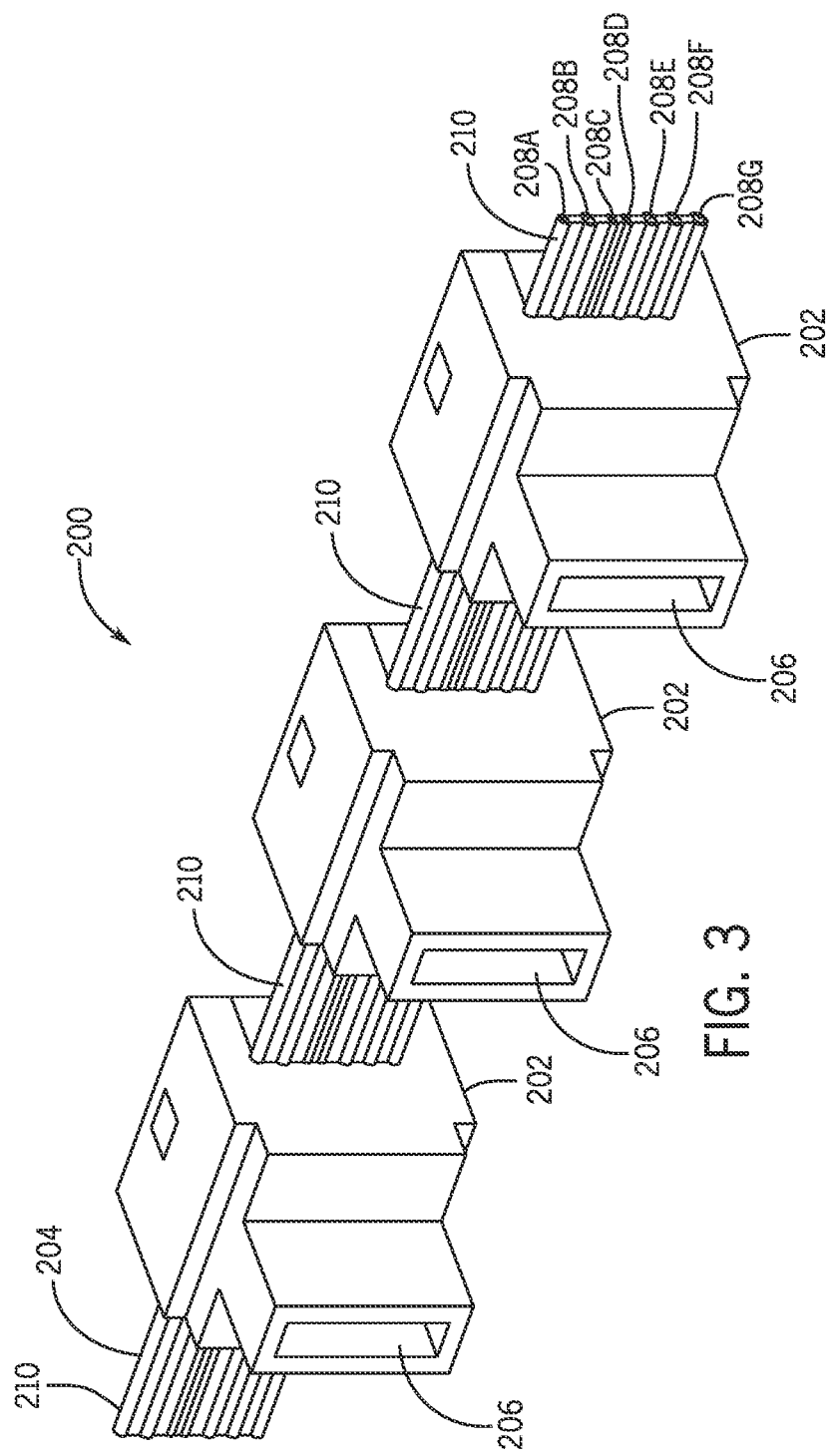
FIG. 3 is a perspective view of a portion of a multidrop cable used in the MCC of FIG. 2, in accordance with embodiments presented herein.

The units within an MCC 100 may join a wired subnet by coupling to one or more multidrop cables that extend through the MCC enclosure 102. In some embodiments, one or more multidrop cables may also extend within a unit, communicatively coupling components within the unit. FIG. 3 depicts a portion of the multidrop cable 200 for use within the MCC 100 of FIG. 2. The illustrated portion of the multidrop cable 200 may include one or more terminals 202 positioned along transmission lines 204. The terminal 202 may include a slot 206 to facilitate electrical connection of an industrial automation device via a tap circuitry (not shown) to the transmission lines 204. A node may include the terminal 202 and a respective connected tap circuitry. In some embodiments, the terminals 202 may be referred to as "drops", while the portions of transmission lines 204 extending between terminals may be referred to as "trunks" 210. Accordingly, the term "multidrop" in multidrop cable 200 refers to the cable 200 having multiple terminals 202 to which components may be connected. In some embodiments, connectors coupled to terminals 202 may enable multiple nodes to be added to the multidrop cable 200 at a single drop (e.g., a plurality of nodes may be coupled to a cable, either in a loop or a single line, that couples to the multidrop cable 200 at one terminal 202). In some embodiments, the multidrop cable 200 may include long trunks 210 between drops 202, or may include no drops 202 at all, such that new drops 202 can be added as needed. Accordingly, the disclosed trunk and drop connector may be used to connect and disconnect MCC withdrawable units without disturbing the network or subnet of the MCC. The transmission lines 204 may include electrical conductors 208A-208G. It should be noted that different number of terminals 202 may be used in different embodiments with the multidrop cable 200 in the MCC 100.

The multidrop cable 200 may facilitate communication between the nodes using various communication protocols. Hence, the number of conductors of transmission lines 204 and the arrangement of the conductors may vary based on the communication protocol being used by the MCC 100. For example, the multidrop cable 200 may use an industrial Ethernet network protocol (EtherNet/IP). The terminals 202 may each include respective tap circuitry that may facilitate connection of various industrial automation components to the transmission lines 204 of the multidrop cable 200. The connectors may facilitate power transmission and/or communication between the input/output signals of the respective node and the transmission lines 204 of the multidrop cable 200.

The MCC 100 may facilitate data communication between different numbers of nodes in different configurations and different directions using the multidrop cable 200. For example, the MCC 100 may communicatively connect motor controllers, VFDs, PLCs, PACs, contactors, starters, overload protection components, fuses, circuit breakers, disconnects, short circuit protectors, etc. within the MCC 100 using one or multiple multidrop cables 200. Also, a node may take any shape or form as long as the connections adhere to the communication protocol of the multidrop cable 200. For example, a sensor 26 (shown in FIG. 1) may be positioned on a tap circuitry, and the tap circuitry may connect to a slot 206 of the terminal 202 to communicate with one or multiple other nodes connected on the multidrop cable 200 through the transmission lines 204.

Figure 4:
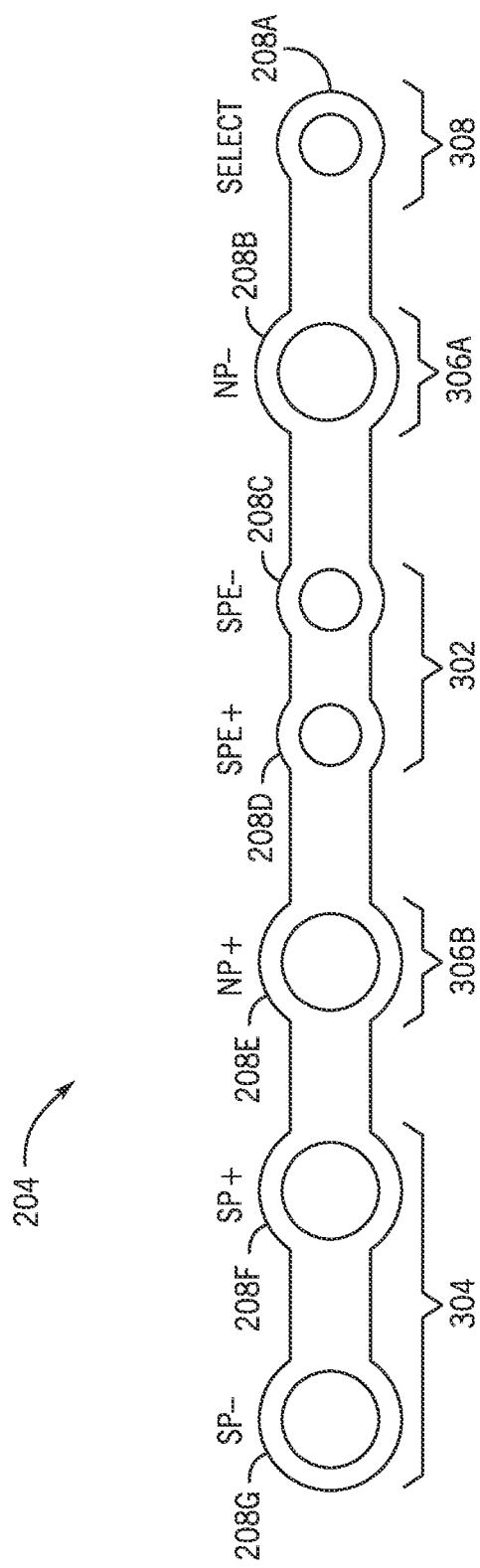
FIG. 4 is a cross-sectional view of the portion of a multidrop cable shown in FIG. 3, in accordance with embodiments presented herein.

FIG. 4 depicts a cross-sectional side view of an embodiment of the transmission lines 204 of the multidrop cable 200 using EtherNet/IP protocol. It should be noted that the multidrop cable 200 is not intended to be limited to the EtherNet/IP protocol or the depicted conductors 208A-208G shown in FIG. 4. The multidrop cable 200 may employ other communication protocols and/or other combination of conductors in different embodiments. Also, the transmission lines 204 may include cables with different wire gauge or conductive materials for different applications.

The transmission lines 204 may include single pair Ethernet (SPE) conductors 302, a switched power (SP) 304 pair, a pair of network power (NP) conductors 306A and 306B, and a select line conductor 308. The SPE 302 may include a first and a second conductor to enable transmission of a differential signal. In certain embodiments, the SPE 302 may be a single pair Ethernet cable and the SP 304 and the NP 306A and 306B may carry Direct Current (DC) power. The SPE 302 conductors may transmit communication signals and the SP 304 conductors may transmit signals in the form of switched electrical power between different nodes. In some embodiments, the SPE 302 and/or the SP 304 may deliver electrical power to one or multiple nodes to power actuators, contactors, and sounders, among other things. The NP 306A and NP 306B conductors may provide electrical power to one or multiple nodes. In some embodiments, the NP 306A and NP 306B conductors may power the communication circuits and/or microcontrollers of the respective one or multiple nodes. Furthermore, the select line conductor 308 may communicate a select line signal to facilitate identification and configuration of nodes. The select line conductor 308 may transmit communication signals and/or facilitate communication or transmission of power signals by the SPE 302 conductors and/or the SP 304 conductors. For example, the select line conductor 308 may include identification numbers associated with selection of a node on the multidrop cable 200. It should be noted that in different examples a selected node by the select line conductor 308 may perform different functions associated with the selected node.

Returning to FIG. 3, as units are added and/or removed from buckets of an MCC, a user may wish to insert or withdraw MCC withdrawable units, this adding or removing nodes from the subnet to accommodate the units being added or removed, without disrupting the network or subnet within the MCC. If insertion and/or removal of a unit within an MCC occurs over too long a period of time, the network or subnet within the MCC may be disturbed (e.g., addresses assigned to nodes get mixed up, confusion over management of transmission of data via the multidrop cable, and so forth. Accordingly, the disclosed embodiments include a trunk and drop connector that acts as a passive mechanical switch for connecting a group of nodes to and/or disconnecting a group of nodes associated with a withdrawable MCC unit without disrupting the network. FIG. 5A illustrates an MCC withdrawable unit 402, including one or more nodes, disconnected from the trunk and drop connector 400. As shown, the MCC withdrawable unit 402 includes input lines 404 and output lines 406 communicatively coupled to pins 408 that are not connected to the trunk and drop connector 400 of the multidrop cable 200. Accordingly, the SPE pair 302, the SP pair 304, the NP pair 306A, 306B, and a select line 308 extend through the trunk 210 uninterrupted.

FIG. 5B illustrates an embodiment of the MCC withdrawable unit 402 connected to the trunk and drop connector 400. The trunk and drop connector 400 may be disposed about the trunk 210 of the multidrop cable 200 or otherwise coupled to the trunk 210 of the multidrop cable 200. In some embodiments, the trunk and drop connector 400 may be permanently installed on the multidrop cable 200, whereas in other embodiments, the trunk and drop connector 400 may pierce, cut through, or otherwise displace insulation disposed about one or more conductors 208A, 208B, 208C, 208D, 208E, 208F, 208G of the multidrop cable 200 in order to electrically couple the unit 402 to the one or more conductors 208A, 208B, 208C, 208D, 208E, 208F, 208G of the multidrop cable 200. In other embodiments, the trunk and drop connector 400 may electrically couple the unit 402 to the one or more conductors 208A, 208B, 208C, 208D, 208E, 208F, 208G of the multidrop cable 200 without disturbing the insulation disposed about the one or more conductors 208A, 208B, 208C, 208D, 208E, 208F, 208G of the multidrop cable 200 by encircling the trunk 210 of the multidrop cable 200 and detecting signals being transmitted by one or more conductors 208A, 208B, 208C, 208D, 208E, 208F, 208G of the multidrop cable 200. In the embodiment illustrated in FIG. 5B, the MCC withdrawable unit 402 may couple to the trunk and drop connector 400 such that input lines 404 of the unit 402 electrically couple to the conductor 208A associated with the select line 308, and the conductors 208C, 208D associated with the SPE pair 302 via the pins 408. Similarly, the MCC withdrawable unit 402 may couple to the trunk and drop connector 400 such that output lines 406 of the unit 402 electrically couple to the conductor 208A associated with the select line 308, and the conductors 208C, 208D associated with the SPE pair 302 via the pins 408. As such, the input lines 404, the unit 402, and the output lines 406 may form a loop to which one or more nodes may be added to the subnet without disrupting the network of the MCC. In some embodiments, connecting the trunk and drop connector 400 to the trunk 210 of the multidrop cable 200 over an extended period of time may disrupt the network within the MCC. Accordingly, the trunk and drop connector 400 may be configured to electrically couple the input lines 404 and the output lines 406 of the MCC withdrawable unit 402 to respective conductors within the trunk 210 of the multidrop cable 200 within a threshold amount of time (e.g., 10 ms, 20 ms, 30 ms, 40 ms, 50 ms, 60 ms, 70 ms, 80 ms, 90 ms, 100 ms, etc.).

As shown in FIG. 5B, the trunk and drop connector 400 may only electrically couple the MCC withdrawable unit 402 to some of the conductors 208A, 208C, 208D of the multidrop cable 200, while the remaining conductors 208B, 208E, 208F, 208G of the multidrop cable 200 remain undisturbed. That is, in the instant embodiment, equipment connecting to new nodes created by the trunk and drop connector 400 may only utilize the SPE pair 302 to communicate with other components within the MCC and then utilize the select line 308 to manage how data is sent via the SPE pair 302. Accordingly, because the equipment connecting to new nodes may draw power from other sources, the SP pair 304 and the NP pair 306 may not be utilized by the equipment connecting to new nodes. In other embodiments, power may be drawn from the SP pair 304 and the NP pair 306 without actually electrically coupling to the SP pair 304 and the NP pair 306. As such, the trunk and drop connector 400 may only be configured to electrically couple the MCC withdrawable unit 402 to the conductors utilized by the equipment connecting to new nodes. However, it should be understood that other embodiments in which the trunk and drop connector 400 electrically couples the MCC withdrawable unit 402 to more, fewer, or different combinations of conductors 208A, 208B, 208C, 208D, 208E, 208F, 208G of the multidrop cable 200 are also envisaged. For example, in some embodiments, the trunk and drop connector 400 may electrically couple to the SP pair 304 and/or the NP pair 306 in addition to electrically coupling to the SPE pair 302 and the select line 308.

Figure 6A:
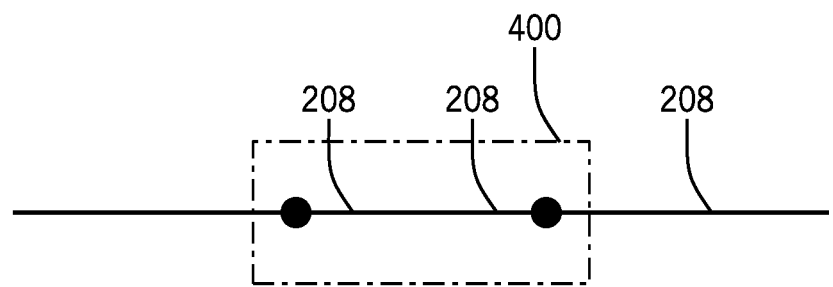
FIG. 6A is schematic view of an embodiment of the trunk and drop connector of FIG. 5, in accordance with embodiments presented herein.
Figure 6B:
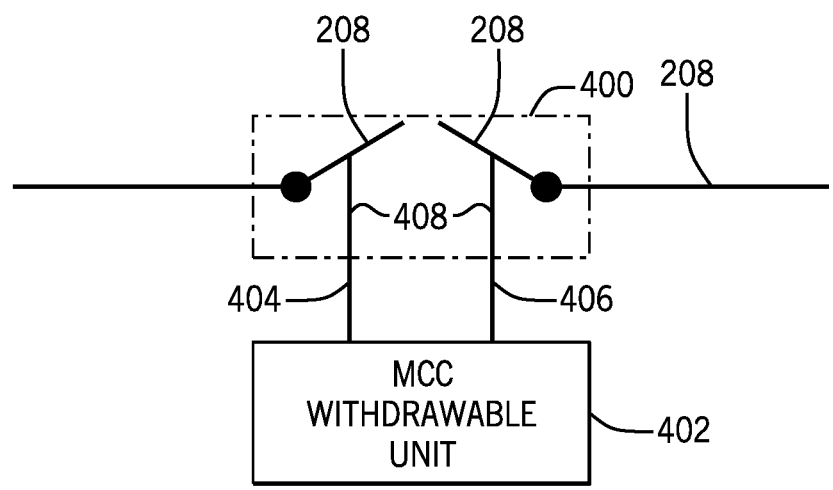
FIG. 6B is schematic view of an embodiment of the trunk and drop connector of FIG. 5, in accordance with embodiments presented herein.

FIGS. 6A and 6B illustrate how MCC withdrawable unit 402 couples to one of the conductors 208 in the trunk 210 of the multidrop cable 200 via the trunk and drop connector 400. Specifically, FIG. 6A is a schematic view illustrating the trunk and drop connector 400 without an MCC withdrawable unit 402 connected. As shown, when an MCC withdrawable unit 402 is not connected to the trunk and drop connector 400, first and second conductors 208 for a given line are in contact with one another and the signal passes through the trunk and drop connector 400 as it would through a trunk of the multidrop cable.

FIG. 6B is a schematic view illustrating the trunk and drop connector 400 with an MCC withdrawable unit 402 connected. As shown, when the pins 408 coupled to the input lines 404 and output lines 406 are inserted into the trunk and drop connector 400 (e.g., as part of a male or female portion of a multidrop cable being coupled to a corresponding female or male portion of the trunk and drop connector 400), the pins 408 displace first and second conductors 208, decoupling the first and second conductors 208 from one another, and coupling a first pin 408 coupled to a respective input line 404 to the first conductor 208, and coupling a second pin 408 coupled to a respective output line 406 to the second conductor 208, thus creating a loop that runs through the MCC withdrawable unit 402. For example, as shown and described in more detail below, a multidrop cable may run through the MCC withdrawable unit 402 disposed in a bucket of the MCC, communicatively coupling one or more nodes within the MCC withdrawable unit 402 that are associated with respective components within the MCC withdrawable unit 402. The trunk and drop connector 400 may be configured such that the time period between the first and second conductors 208 being decoupled from one another and the first and second pins 408 coupling to the respective first and second conductors 208 is short enough that the subnet or network within the MCC is not disturbed. For example, the time period between the first and second conductors 208 being decoupled from one another and the first and second pins 408 coupling to the respective first and second conductors 208 may be less than 10 ms, 20 ms, 30 ms, 40 ms, 50 ms, 60 ms, 70 ms, 80 ms, 90 ms, 100 ms, and so forth.

Similarly, when the pins 408 coupled to the input lines 404 and output lines 406 are removed from the trunk and drop connector 400 (e.g., the male or female portion of the multidrop cable is decoupled from the corresponding female or male portion of the trunk and drop connector 400), the first and second pins 408 are decoupled from the respective first and second conductors 208, allowing the first and second conductors 208 to return to their natural state and recouple to one another, such that the signal passes through the trunk and drop connector 400 as it would through a trunk of the multidrop cable. The trunk and drop connector 400 may also be configured such that the time period between the first and second pins 408 decoupling from the respective first and second conductors 208 and the first and second conductors 208 being recoupled to one another is short enough that the subnet or network within the MCC is not disturbed. For example, the time period between the first and second pins 408 decoupling from the respective first and second conductors 208 and the first and second conductors 208 being recoupled to one another may be less than 10 ms, 20 ms, 30 ms, 40 ms, 50 ms, 60 ms, 70 ms, 80 ms, 90 ms, 100 ms, and so forth. Accordingly, the MCC withdrawable unit 402 may be inserted and withdrawn from the MCC without disturbing the subnet or the network within the MCC.

Figure 7:
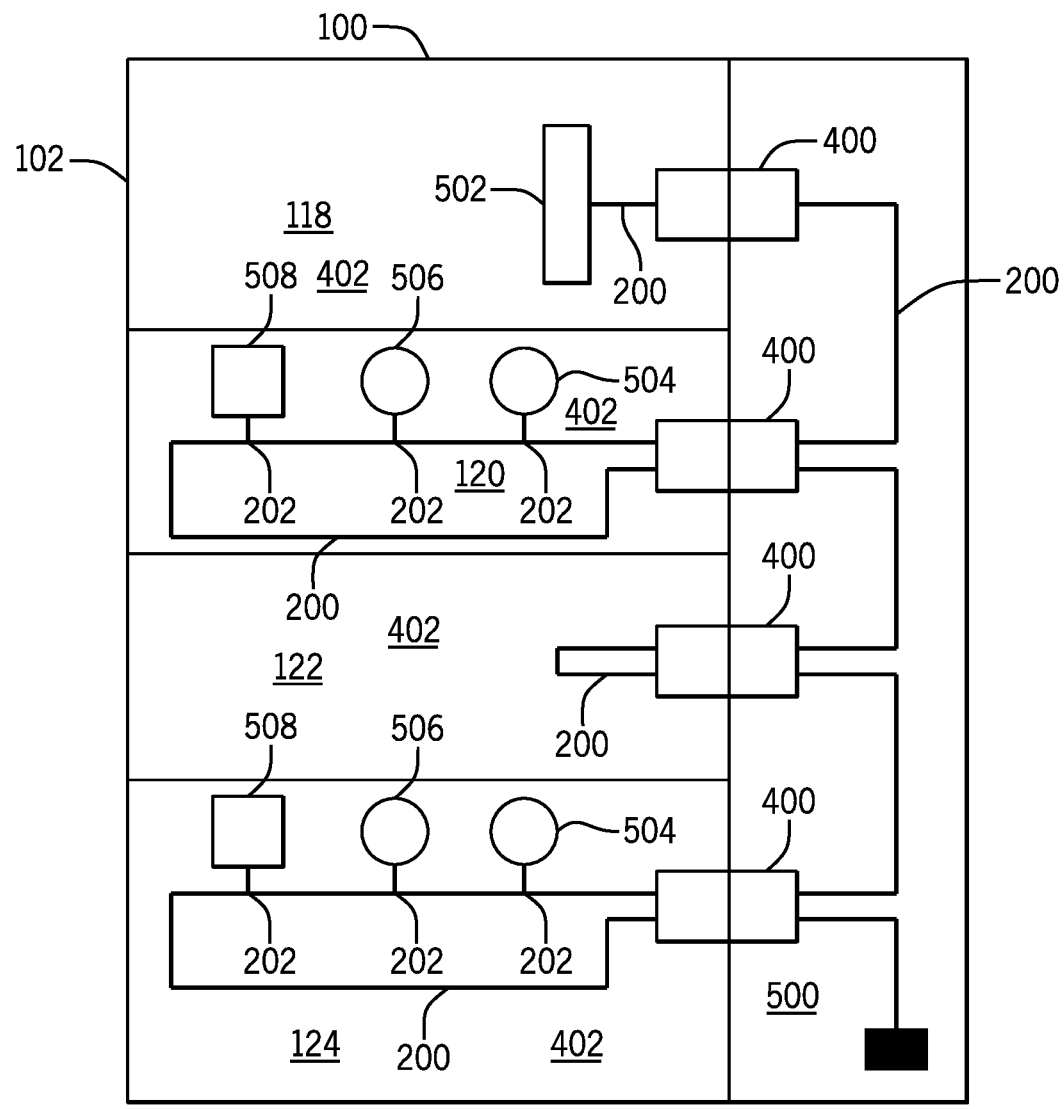
FIG. 7 is a schematic view of the MCC in which one of the buckets is connected to the multidrop cable via the trunk and drop connector, in accordance with embodiments presented herein.

FIG. 7 illustrates a schematic view of an MCC 100 in which MCC withdrawable units 402 installed in buckets 120 are connected to the multidrop cable 200 via trunk and drop connectors 400. As shown, the MCC 100 includes buckets 118, 120, 122, 124, which house MCC withdrawable units 402. Buckets 118, 122, and 124 are connected to the subnet via trunk and drop connectors of the multidrop cable 200 running through a wireway 500 and include various pieces of equipment 502, 504, 506, 508 connected to one another via multidrop cables 200 having terminals 202 at nodes within the buckets 118, 122, 124. As previously described, if the operator of the MCC 100 wishes to insert or remove a bucket 120, or add more nodes to the subnet, without disturbing the subnet, the operator may utilize the disclosed trunk and drop connector 400. In the embodiment shown in FIG. 7, buckets 120 and 124 include multidrop cables 200 forming loops within the buckets 120, 124 that connect pieces of equipment 504, 506, 508 via terminals 202 disposed at nodes. The equipment 502, 504, 506, 504 may include, for example, motor controllers, VFDs, PLCs, PACs, contactors, starters, overload protection components, fuses, circuit breakers, disconnects, short circuit protectors, interfaces, indicators, buttons, switches, displays, sensors, and so forth. Though the MCC withdrawable units 402 installed in buckets 120 and 124 shown in FIG. 7 include three nodes 202, it should be understood that the MCC withdrawable units 402 installed in buckets 118, 120, 122, 124 of the MCC 100 may include other numbers of nodes 202. For example, embodiments are envisaged in which the MCC withdrawable units 402 include 2, 3, 4, 5, 6, 7, 8, 9, 10, or more nodes.

Figure 8:
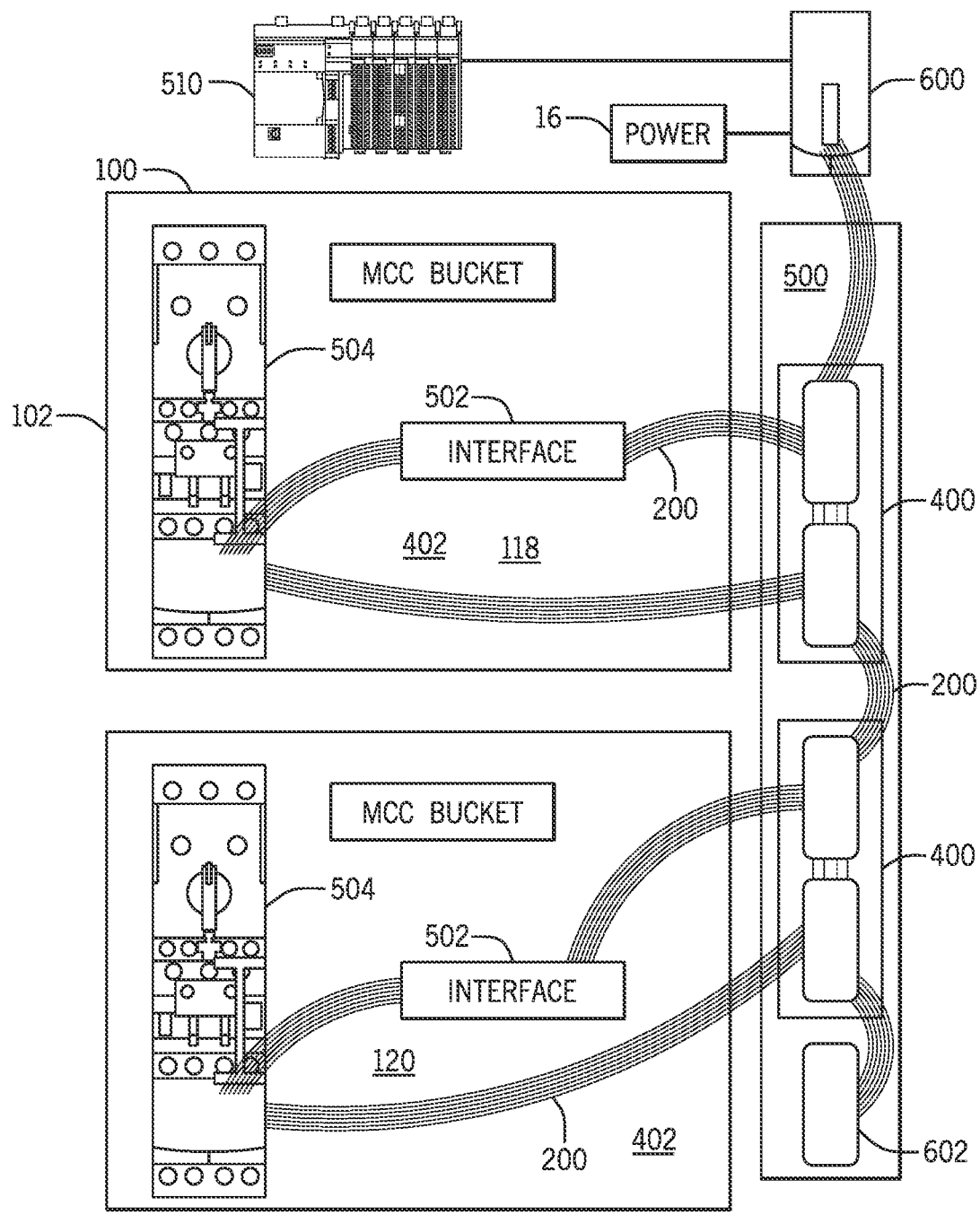
FIG. 8 is a schematic view of the MCC having two buckets connected to the multidrop cable via the trunk and drop connectors, in accordance with embodiments presented herein.

FIG. 8 illustrates a schematic view of an MCC 100 having two MCC withdrawable units 402 installed in two respective buckets 118, 120 that are connected to the multidrop cable 200 via trunk and drop connectors 400. As shown, power from a power source 16 and a control signal generated by a PLC 510 is provided to a gateway 600. The multidrop cable 200 extends from the gateway 600 through the wireway 500 to a terminator 602. A first trunk and drop connector 400 couples an MCC withdrawable unit 402 installed in a first bucket 118, and including an interface 502, and a piece of equipment 504. The interface 502 may include, for example, push buttons, knobs, switches, indicator lights, gauges, displays, touch screens, etc. The equipment 504 in the first bucket 118 may include, for example, motor controllers, VFDs, PLCs, PACs, contactors, starters, overload protection components, fuses, circuit breakers, disconnects, short circuit protectors, interfaces, indicators, buttons, switches, displays, sensors, and so forth.

Similarly, a second trunk and drop connector 400 may be coupled a second MCC withdrawable unit 402 installed in a second bucket 120, and including an interface 502, and a piece of equipment 504. As with the MCC withdrawable unit 402 installed in the first bucket 118, the interface 502 may include, push buttons, knobs, switches, indicator lights, gauges, displays, touch screens, etc. However, the interface 502 of the MCC withdrawable unit 402 installed in the second bucket 120 may or may not be the same as the interface 502 MCC withdrawable unit 402 installed in the first bucket 118. As with the first bucket 118, the equipment 504 in the MCC withdrawable unit 402 installed in the second bucket 120 may include, for example, motor controllers, VFDs, PLCs, PACs, contactors, starters, overload protection components, fuses, circuit breakers, disconnects, short circuit protectors, interfaces, indicators, buttons, switches, displays, sensors, and so forth. Similarly, the equipment 504 in the MCC withdrawable unit 402 installed in the second bucket 120 may or may not be the same as the equipment 504 that is in the MCC withdrawable unit 402 installed in the first bucket 118. Further, multidrop cables 200 within the different buckets may have different numbers of nodes for different configurations of components. For example, multidrop cable 200 in the first bucket 118 may include four nodes, while a second multidrop cable 200 in the second bucket 120 may include three nodes, based upon what pieces of equipment and how many new nodes an operator wishes to include.

Figure 9:
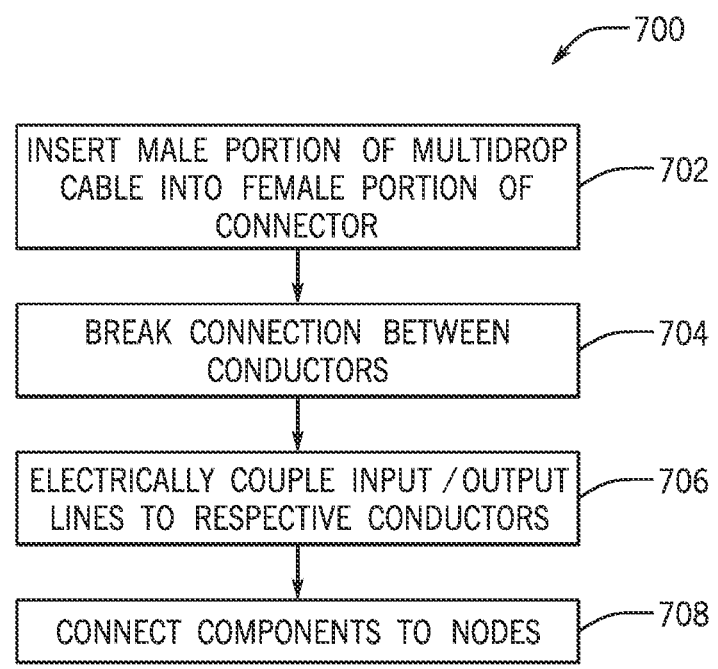
FIG. 9 is a flow chart of a process 700 for connecting a withdrawable MCC unit to a trunk and drop connector of a multidrop cable.

FIG. 9 is a flow chart of a process 700 for connecting an MCC withdrawable unit to a trunk and drop connector of a multidrop cable. At block 702, a male portion of the unit connector may be inserted into a female portion of the trunk and drop connector. It should be understood, however, that embodiments in which the male/female portions are reversed (e.g., male portion on unit connector, female portion on trunk and drop connector) are also envisaged. Further, the unit connector may be a portion of a unit housing configured to be inserted into a bucket, a connector coupled to a cable, such as a multidrop cable, or some other configuration. In some embodiments, the trunk and drop connector may merely be wrapped around or otherwise disposed about the multidrop cable. In other embodiments, the trunk and drop connector may clamp on to the multidrop cable or otherwise physically couple to the multidrop cable. At block 704, the connection between first and second conductors of the trunk and drop connector is broken by first and second respective sets of pins of the male portion of the unit connector. For example, the pins of the male portion of the unit connector may be inserted into the trunk and drop connector such that the first and second sets of pins make contact with the first and second sets of conductors and then apply a force to the first and second sets of conductors, forcing the first and second sets of conductors to be displaced, thus breaking the electrical connection between the first and second sets conductors. Accordingly, at block 706, the first and second sets of pins, which are communicatively coupled to the input lines and the output lines, respectively, are electrically coupled to the SPE pair and the select line. As previously discussed, in some embodiments, the multidrop cable may be manufactured with one or more trunk and drop connectors attached. In other embodiments, the trunk and drop connector may be coupled to the multidrop cable after the fact. For example, the trunk and drop connector may pierce, cut through, or otherwise displace insulation disposed about one or more conductors of the multidrop cable in order to electrically couple the unit to the one or more conductors of the multidrop cable. In other embodiments, the trunk and drop connector may electrically couple the unit to the one or more conductors of the multidrop cable without disturbing the insulation disposed about the one or more conductors of the multidrop cable. At block 708, components may be connected to the nodes within the MCC withdrawable unit coupled to the network or subnet via the trunk and drop connector. As previously described, the connected components may include, for example, motor controllers, VFDs, PLCs, PACs, contactors, starters, overload protection components, fuses, circuit breakers, disconnects, short circuit protectors, interfaces, indicators, buttons, switches, displays, sensors, and so forth. The MCC may then be operated to control one or more actuators of an industrial automation system.

The disclosed techniques include a trunk and drop connector for coupling to a withdrawable MCC unit to a multidrop cable. Specifically, the multidrop cable may serve as a trunkline and may include conductors that form a single pair Ethernet (SPE) pair that facilitate communication of data between components of the subnet, a switched power (SP) pair that provide power to components of the subnet, a network power (NP) pair that provide power for the subnet, and a select line that manages communication via the SPE pair. The trunk and drop connector includes pins that couple input and output lines of an MCC withdrawable unit to the SPE pair and the selection line but allow the SP pair and NP to continue through the trunk line uninterrupted. The trunk and drop connector enables the addition of multiple nodes, within the MCC withdrawable unit, to the subnet to which various components (e.g., variable frequency drives (VFDs), programmable logic controllers (PLCs), programmable automation controllers (PACs), contactors, starters, overload protection components, fuses, circuit breakers, disconnects, short circuit protectors, etc.) may connect. Further, the trunk and drop connector enables withdrawable MCC units to be coupled to a decoupled from the multidrop cable in a way that does not disturb the network or subnet within the MCC.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A multidrop cable configured to be installed within a motor control center (MCC) of an industrial automation system comprising:
   a trunk;
   a first connector coupled to a first end of the trunk, wherein the first connector comprises a first terminal configured to communicatively couple to a first unit installed in first bucket of the MCC; and
   a second connector coupled to a second end of the trunk, wherein the second connector is configured to communicatively couple to a second unit installed in a second bucket of the MCC, wherein the second unit comprises an MCC withdrawable unit, and wherein the second connector is configured to couple the MCC withdrawable unit to, and decouple the MCC withdrawable unit from, the multidrop cable without disrupting a network or a subnet of the MCC.

2. The multidrop cable of claim 1, wherein the multidrop cable comprises:
   a single pair Ethernet (SPE) pair;
   a switched power (SP) pair;
   a network power (NP) pair; and
   a select line.

3. The multidrop cable of claim 2, wherein the SPE pair comprises first and second conductors, wherein the SP pair comprises third and fourth conductors, wherein the NP pair comprises fifth and sixth conductors, and wherein the select line comprises a seventh conductor.

4. The multidrop cable of claim 3, wherein the second connector is communicatively coupled to the first conductor, the second conductor, and the seventh conductor.

5. The multidrop cable of claim 4, wherein the second connector comprises:
   a first input line communicatively coupled to the first conductor;
   a second input line communicatively coupled to the second conductor;
   a third input line communicatively coupled to the seventh conductor;
   a first output line communicatively coupled to the first conductor;
   a second output line communicatively coupled to the second conductor; and
   a third output line communicatively coupled to the seventh conductor.

6. The multidrop cable of claim 1, wherein the MCC withdrawable unit comprises one or more motor controllers, one or more variable frequency drives (VFDs), one or more programmable logic controllers (PLCs), one or more programmable automation controllers (PACs), one or more contactors, one or more motor starters, one or more overload protection components, one or more fuses, one or more circuit breakers, one or more disconnect switches, one or more short circuit protectors, or a combination thereof.

7. The multidrop cable of claim 1, wherein the MCC withdrawable unit comprises one or more push buttons, one or more knobs, one or more switches, one or more indicator lights, one or more gauges, one or more displays, one or more touch screens, or a combination thereof.

8. A first connector configured to communicatively couple a trunk of a multidrop cable to a motor control center (MCC) withdrawable unit of an MCC for an industrial automation system, wherein the trunk of the multidrop cable is communicatively coupled to a second connector comprising a first terminal, wherein the first connector comprises:
   one or more input pins communicatively coupled to one or more conductors extending through the trunk of the multidrop cable; and
   one or more output pins communicatively coupled to the one or more conductors extending through the trunk of the multidrop cable;
   wherein the first connector connects a plurality of nodes associated with the MCC withdrawable unit installed in a bucket of the MCC to a network or a subnet of the MCC, wherein the first connector is configured to couple the MCC withdrawable unit to, and decouple the MCC withdrawable unit from, the multidrop cable without disrupting a network or a subnet of the MCC.

9. The first connector of claim 8, wherein the multidrop cable comprises:
   a single pair Ethernet (SPE) pair;
   a switched power (SP) pair;
   a network power (NP) pair; and
   a select line.

10. The first connector of claim 9, wherein the SPE pair comprises first and second conductors, wherein the SP pair comprises third and fourth conductors, wherein the NP pair comprises fifth and sixth conductors, and wherein the select line comprises a seventh conductor.

11. The first connector of claim 10, wherein the first connector is communicatively coupled to the first conductor, the second conductor, and the seventh conductor.

12. The first connector of claim 11, wherein:
the one or more input pins comprise:
a first input pin communicatively coupled to the first conductor;
a second input pin communicatively coupled to the second conductor; and
a third input pin communicatively coupled to the seventh conductor; and
the one or more input pins comprise:
a first output pin communicatively coupled to the first conductor;
a second output pin communicatively coupled to the second conductor; and
a third output pin communicatively coupled to the seventh conductor.

13. The first connector of claim 8, wherein the MCC withdrawable unit comprises one or more motor controllers, one or more variable frequency drives (VFDs), one or more programmable logic controllers (PLCs), one or more programmable automation controllers (PACs), one or more contactors, one or more motor starters, one or more overload protection components, one or more fuses, one or more circuit breakers, one or more disconnect switches, one or more short circuit protectors, or a combination thereof.

14. The first connector of claim 8, wherein the MCC withdrawable unit comprises one or more push buttons, one or more knobs, one or more switches, one or more indicator lights, one or more gauges, one or more displays, one or more touch screens, or a combination thereof.

15. A system, comprising:
a motor control center (MCC) of an industrial automation system, comprising:
a first bucket; and
a second bucket; and
a multidrop cable, comprising:
a trunk;
a first connector coupled to a first end of the trunk, wherein the first connector comprises a first terminal configured to communicatively couple to a first unit installed in the first bucket of the MCC; and
a second connector coupled to a second end of the trunk, wherein the second connector is configured to communicatively couple to a second unit installed in the second bucket of the MCC, wherein the second unit comprises an MCC withdrawable unit, and wherein the second connector is configured to couple the MCC withdrawable unit to, and decouple the MCC withdrawable unit from, the multidrop cable without disrupting a network or a subnet of the MCC.

16. The system of claim 15, wherein the multidrop cable comprises:
a single pair Ethernet (SPE) pair;
a switched power (SP) pair;
a network power (NP) pair; and
a select line.

17. The system of claim 16, wherein the SPE pair comprises first and second conductors, wherein the SP pair comprises third and fourth conductors, wherein the NP pair comprises fifth and sixth conductors, and wherein the select line comprises a seventh conductor.

18. The system of claim 17, wherein the second connector is communicatively coupled to the first conductor, the second conductor, and the seventh conductor.

19. The system of claim 17, wherein the second connector comprises:
a first input pin communicatively coupled to the first conductor;
a second input pin communicatively coupled to the second conductor;
a third input pin communicatively coupled to the seventh conductor;
a first output pin communicatively coupled to the first conductor;
a second output pin communicatively coupled to the second conductor; and
a third output pin communicatively coupled to the seventh conductor.

20. The system of claim 15, wherein the MCC withdrawable unit comprises one or more motor controllers, one or more variable frequency drives (VFDs), one or more programmable logic controllers (PLCs), one or more programmable automation controllers (PACs), one or more contactors, one or more motor starters, one or more overload protection components, one or more fuses, one or more circuit breakers, one or more disconnect switches, one or more short circuit protectors, or a combination thereof.

* * * * *